April 26, 1949. E. G. SPIETH 2,468,470
FARM SLED
Filed March 19, 1946

INVENTOR.
EDWIN G. SPIETH,
BY
ATTORNEYS.

Patented Apr. 26, 1949

2,468,470

UNITED STATES PATENT OFFICE 2,468,470

FARM SLED

Edwin G. Spieth, Omaha, Nebr.

Application March 19, 1946, Serial No. 655,406

1 Claim. (Cl. 280—24)

My invention relates to an all-purpose sled especially adapted to be drawn over the ground for the hauling of construction materials, farm machinery, farm products, and other loads, the primary object of my invention being to provide a sled of this character which reduces the high lift ordinarily required for loading and unloading a truck or trailer and which furnishes a more suitable and efficient means for transporting manually or crane loaded burdens over the ground thereby reducing the expense, time, and labor of many on-the-job hauling operations.

Another important object of my invention is to provide a simple, relatively inexpensive, and rugged sled of the character indicated which can be constructed if desired in an easily assembled knock-down form, thereby facilitating the transportation and storing of the sleds.

Other important objects and advantages of my invention will appear in the following detailed description and appended drawings, showing, for purposes of illustration only, a preferred embodiment of my invention.

Figure 1:
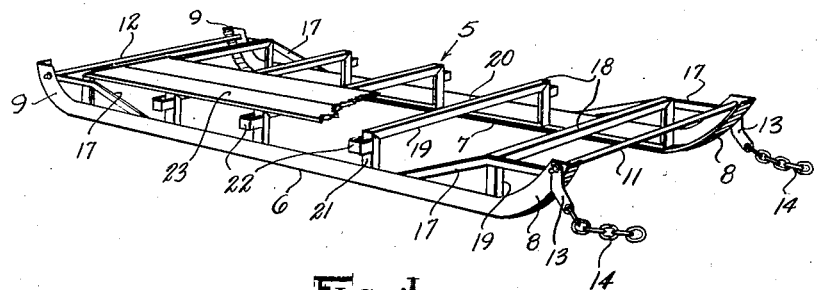
Figure 1 is a front perspective view of a sled in accordance with the present invention, with the platform partly broken away to show structure.
Figure 2:
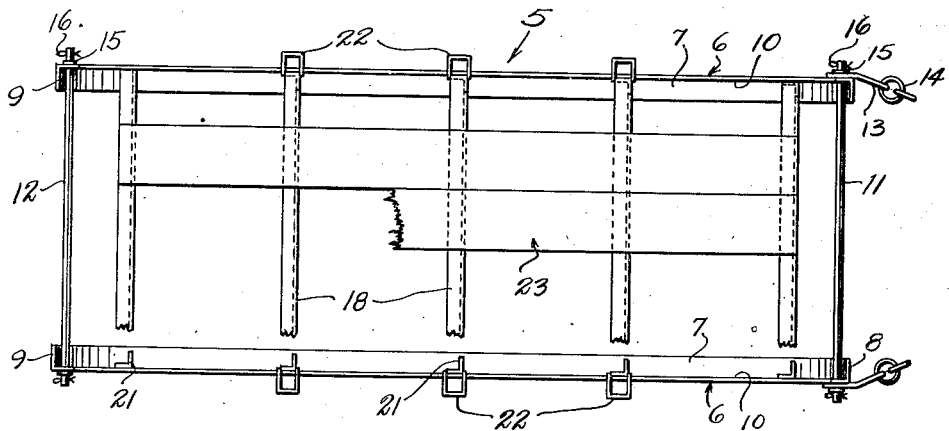
Figure 2 is a top plan view partly broken away to reveal details of construction.

Referring in detail to the drawings, the sled, generally designated 5, may be of any suitable dimensions, but the preferred dimensions are a length of about 8 or 9 feet, a width of about 3 or 4 feet, and a height of about 8 inches. Any suitable form of body, (not shown) or a plain platform as shown in the drawings may be mounted in suitable manner on the sled in accordance with hauling requirements.

The sled 5 comprises a pair of angle-iron runners 6 preferably of steel, with their lateral flanges 7 directed inwardly, and with their opposite ends 8 and 9, respectively, curved upwardly. The vertical flanges 10 of the runners at the ends 8 and 9 may be traversed by rods 11 and 12, respectively, which act as braces and as axles for the pivoted levers 13 to which the draft chains 14 are connected, the levers 13 being located on the rods outside of the runners and held in place by washers 15 and cotter-pins or the like 16.

Additional braces 17 for the turned up ends 8 and 9 of the runners are secured to extend between the upper portions of the turned up ends 8 and 9 and points on the vertical flanges of the runners somewhat to the rear and forward, respectively, of the turned up ends.

Figure 3:
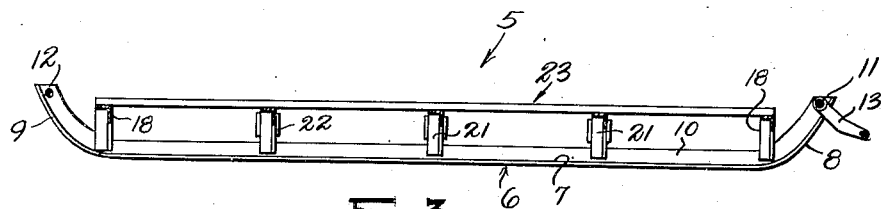
Figure 3 is a vertical longitudinal sectional view.

The runners 6 are secured in spaced parallelism by inverted U-shaped angle-iron cross members 18, like the runners 6, preferably of steel. The vertical flanges 19 of the horizontal part 20 of the cross members are disposed toward the front of the sled, while continuations of the same flanges in the dependent parts 21 of the cross members bear against the laterally inward sides of the vertical flanges 10 of the runners, with the lower ends of the parts 21 upwardly spaced from their horizontal flanges 7, as shown in Figure 3.

While the drawing shows the component parts, such as the runners and cross members welded or fused together, it will be understood that bolts may be substituted where a knock-down assembly of the component parts is desired.

Attached to the laterally outward sides of depending parts 21 are wagon stake loops or sockets 22, whereby the advantages of a stake body may be had by inserting stakes therein, and with or without the platform 23 formed of boards or plates of other suitable material, secured to the horizontal parts of the cross members 18. As shown in the drawings, the front and rear cross members 18 are located at the turn of the upturned ends 8 and 9, and the other cross members are substantially equidistantly spaced therefrom and from each other.

The construction described provides a structurally sound assembly, affording adequate flexibility as well as rigidity and unusual load-carrying capacity even though comparatively light gauge material be used for the components.

I claim:

In a general-purpose sled comprising a pair of laterally-spaced angle iron runners including horizontal and vertical flanges arranged with their horizontal flanges directed laterally inwardly and the ends of the runners being turned upwardly, the features which include a plurality of inverted spaced-apart U-shaped angle iron cross-members disposed between and connected to the runners, the upwardly vertical portions of said angle iron cross-members having their transverse flanges directed forwardly and their vertical flanges secured to the laterally inward side of the vertical flanges of the runners, draft means including rods extending between upper extremities of the upturned ends of the runners, and supplemental braces including horizontal portions extending longitudinally to the upper extremity of each upturned end of said runners and to the adjacent angle iron cross-member, and an integral angularly-downwardly-inclined portion extending rigidly from said adjacent cross-member and secured to the vertical flange of the runner between said adjacent angle iron member and the next adjacent angle-iron member, and being integrally continuous with each longitudinally-extending horizontal portion.

EDWIN G. SPIETH.

REFERENCES CITED

The following references are of record in the file of this patent:

UNITED STATES PATENTS

| Number | Name | Date |
| --- | --- | --- |
| 883,050 | Poindexter | Mar. 24, 1908 |
| 883,258 | Tolle | Mar. 31, 1908 |
| 2,099,898 | Larkin | Nov. 23, 1937 |